United States Patent
Son

[11] Patent Number: 5,959,872
[45] Date of Patent: Sep. 28, 1999

[54] APPARATUS AND METHOD FOR BIDIRECTIONAL SCANNING OF VIDEO COEFFICIENTS

[75] Inventor: Jae-Cheol Son, Kyungki-do, Rep. of Korea

[73] Assignee: Samsung Electronics Co., Ltd., Kyungki-do, Rep. of Korea

[21] Appl. No.: 08/738,567

[22] Filed: Oct. 28, 1996

[51] Int. Cl.[6] .......................... G06F 17/14; H04N 11/02
[52] U.S. Cl. ................... 364/725.03; 348/404; 348/419; 382/250
[58] Field of Search .......................... 364/725.01–725.03, 364/726.01–726.07, 727.01; 348/206, 400, 404, 419, 420; 382/232, 245–253

[56] References Cited

U.S. PATENT DOCUMENTS

| | | | |
|---|---|---|---|
| 4,933,763 | 6/1990 | Chantelou | 348/420 |
| 5,005,076 | 4/1991 | Stroppina et al. | 348/400 |
| 5,371,811 | 12/1994 | Morrison et al. | 382/250 |
| 5,530,478 | 6/1996 | Sasaki et al. | 348/405 |
| 5,666,461 | 9/1997 | Igarashi et al. | 386/95 |

*Primary Examiner*—Emmanuel L. Moise
*Attorney, Agent, or Firm*—Skjerven, Morrill, MacPherson, Franklin & Friel; David T. Millers

[57] ABSTRACT

A bidirectional discrete cosine transform (DCT) coefficient scanning apparatus includes a buffer memory, an address generator based on a look-up table for converting a first address signal to a second address signal according to a DCT coefficient scan order, a first selection section for selecting the second address signal or a third address signal as the address signal for the buffer memory, and a second selection section for selecting a quantized DCT coefficient or a decoded DCT coefficient to be written to the buffer memory during coding or decoding. During coding, quantized DCT coefficients from a quantization section are written to locations in the buffer memory identified by the third address signal, and read out to a run-length and level coding section from locations in the buffer memory identified by the second address signal. During decoding, decoded DCT coefficients from a run-length and level decoding section are written to locations in the buffer memory identified by the second address signal, and read out to a dequantization section from locations in the buffer memory identified by the third address signal.

14 Claims, 3 Drawing Sheets

FIG.2

|   | 0 | 1 | 2 | 3 | 4 | 5 | 6 | 7 |
|---|---|---|---|---|---|---|---|---|
| 0 | 0 | 1 | 5 | 6 | 14 | 15 | 27 | 28 |
| 1 | 2 | 4 | 7 | 13 | 16 | 26 | 29 | 42 |
| 2 | 3 | 8 | 12 | 17 | 25 | 30 | 41 | 43 |
| 3 | 9 | 11 | 18 | 24 | 31 | 40 | 44 | 53 |
| 4 | 10 | 19 | 23 | 32 | 39 | 45 | 52 | 54 |
| 5 | 20 | 22 | 33 | 38 | 46 | 51 | 55 | 60 |
| 6 | 21 | 34 | 37 | 47 | 50 | 56 | 59 | 61 |
| 7 | 35 | 36 | 48 | 49 | 57 | 58 | 62 | 63 |

FIG.3

|   | 0 | 1 | 2 | 3 | 4 | 5 | 6 | 7 |
|---|---|---|---|---|---|---|---|---|
| 0 | 0 | 4 | 6 | 20 | 22 | 36 | 38 | 52 |
| 1 | 1 | 5 | 7 | 21 | 23 | 37 | 39 | 53 |
| 2 | 2 | 8 | 19 | 24 | 34 | 40 | 50 | 54 |
| 3 | 3 | 9 | 18 | 25 | 35 | 41 | 51 | 55 |
| 4 | 10 | 17 | 26 | 30 | 42 | 46 | 56 | 60 |
| 5 | 11 | 16 | 27 | 31 | 43 | 47 | 57 | 61 |
| 6 | 12 | 15 | 28 | 32 | 44 | 48 | 58 | 62 |
| 7 | 13 | 14 | 29 | 33 | 45 | 49 | 59 | 63 |

FIG.4

| (a) | | | (b) | | |
|---|---|---|---|---|---|
| RLC_adr[5:0] | ALT_scan | ZZ_adr[5:0] | RLC_adr[5:0] | ALT_scan | ZZ_adr[5:0] |
| 000000 | 0 | 000000 | 000000 | 1 | 000000 |
| 000001 | 0 | 000001 | 000001 | 1 | 001000 |
| 000010 | 0 | 001000 | 000010 | 1 | 010000 |
| 000011 | 0 | 010000 | 000011 | 1 | 011000 |
| 000100 | 0 | 001001 | 000100 | 1 | 000001 |
| 000101 | 0 | 000010 | 000101 | 1 | 001001 |
| 000110 | 0 | 000011 | 000110 | 1 | 000010 |
| 000111 | 0 | 001010 | 000111 | 1 | 001010 |
| 001000 | 0 | 010001 | 001000 | 1 | 010001 |
| 001001 | 0 | 011000 | 001001 | 1 | 011001 |
| 001010 | 0 | 100000 | 001010 | 1 | 100000 |
| 001011 | 0 | 011001 | 001011 | 1 | 101000 |
| 001100 | 0 | 010010 | 001100 | 1 | 110000 |
| 001101 | 0 | 001011 | 001101 | 1 | 111000 |
| 001110 | 0 | 000100 | 001110 | 1 | 111001 |
| 001111 | 0 | 000101 | 001111 | 1 | 110001 |
| 010000 | 0 | 001100 | 010000 | 1 | 101001 |
| 010001 | 0 | 010011 | 010001 | 1 | 100001 |
| 010010 | 0 | 011010 | 010010 | 1 | 011010 |
| 010011 | 0 | 100001 | 010011 | 1 | 010010 |
| 010100 | 0 | 101000 | 010100 | 1 | 000011 |
| 010101 | 0 | 110000 | 010101 | 1 | 001011 |
| 010110 | 0 | 101001 | 010110 | 1 | 000100 |
| 010111 | 0 | 100010 | 010111 | 1 | 001100 |
| 011000 | 0 | 011011 | 011000 | 1 | 010011 |
| 011001 | 0 | 010100 | 011001 | 1 | 011011 |
| 011010 | 0 | 001101 | 011010 | 1 | 100010 |
| 011011 | 0 | 000110 | 011011 | 1 | 101010 |
| 011100 | 0 | 000111 | 011100 | 1 | 110010 |
| 011101 | 0 | 001110 | 011101 | 1 | 111010 |
| 011110 | 0 | 010101 | 011110 | 1 | 100011 |
| 011111 | 0 | 011100 | 011111 | 1 | 101011 |
| 100000 | 0 | 100011 | 100000 | 1 | 110011 |
| 100001 | 0 | 101010 | 100001 | 1 | 111011 |
| 100010 | 0 | 110001 | 100010 | 1 | 010100 |
| 100011 | 0 | 111000 | 100011 | 1 | 011100 |
| 100100 | 0 | 111001 | 100100 | 1 | 000101 |
| 100101 | 0 | 110010 | 100101 | 1 | 001101 |
| 100110 | 0 | 101011 | 100110 | 1 | 000110 |
| 100111 | 0 | 100100 | 100111 | 1 | 001110 |
| 101000 | 0 | 011101 | 101000 | 1 | 010101 |
| 101001 | 0 | 010110 | 101001 | 1 | 011101 |
| 101010 | 0 | 001111 | 101010 | 1 | 100100 |
| 101011 | 0 | 010111 | 101011 | 1 | 101100 |
| 101100 | 0 | 011110 | 101100 | 1 | 110100 |
| 101101 | 0 | 100101 | 101101 | 1 | 111100 |
| 101110 | 0 | 101100 | 101110 | 1 | 100101 |
| 101111 | 0 | 110011 | 101111 | 1 | 101101 |
| 110000 | 0 | 111010 | 110000 | 1 | 110101 |
| 110001 | 0 | 111011 | 110001 | 1 | 111101 |
| 110010 | 0 | 110100 | 110010 | 1 | 010110 |
| 110011 | 0 | 101101 | 110011 | 1 | 011110 |
| 110100 | 0 | 100110 | 110100 | 1 | 000111 |
| 110101 | 0 | 011111 | 110101 | 1 | 001111 |
| 110110 | 0 | 100111 | 110110 | 1 | 010111 |
| 110111 | 0 | 101110 | 110111 | 1 | 011111 |
| 111000 | 0 | 110101 | 111000 | 1 | 100110 |
| 111001 | 0 | 111100 | 111001 | 1 | 101110 |
| 111010 | 0 | 111101 | 111010 | 1 | 110110 |
| 111011 | 0 | 110110 | 111011 | 1 | 111110 |
| 111100 | 0 | 101111 | 111100 | 1 | 100111 |
| 111101 | 0 | 110111 | 111101 | 1 | 101111 |
| 111110 | 0 | 111110 | 111110 | 1 | 110111 |
| 111111 | 0 | 111111 | 111111 | 1 | 111111 |

APPARATUS AND METHOD FOR BIDIRECTIONAL SCANNING OF VIDEO COEFFICIENTS

BACKGROUND OF THE INVENTION

FIELD OF THE INVENTION

This invention relates to bidirectional scanning of two-dimensional data arrays in systems using multiple processing orders, and in particular, to an apparatus for scanning of discrete cosine transform (DCT) coefficients for coding and decoding in a multi-standard video codec.

DESCRIPTION OF THE PRIOR ART

Video standards such as JPEG, MPEG-1, MPEG-2, H.261, and H.263 process DCT coefficients in zig-zag order. For example, coding may generate and quantize a two-dimensional array of DCT coefficients in a raster scan order but take DCT coefficients in a zig-zag order for a run-length and level coding (RLC). Run-length coding uses the zig-zag order because the zig-zag order tends to provide longer runs which can be efficiently compressed. Accordingly, during encoding and decoding, a scanning process to reorder the DCT coefficients is commonly performed between quantization or dequantization of DCT coefficients and run-length coding or decoding.

Instead of zig-zag order, the MPEG-2 standard optionally employs an alternate scanning order. The alternate scanning order is particularly powerful in processing an interlaced video signal since the alternate scanning order can effectively select interlaced components of the video signal.

In a video codec for data compression and decompression according to the above video standards, logic for carrying out coefficient reordering both in a forward (coding) direction and an inverse (decoding) directions is needed.

SUMMARY OF THE INVENTION

It is an object of the invention to provide an apparatus and method for bidirectional DCT coefficient scanning in a multi-standard video codec and to effectively implement the logic for the scan conversion of DCT coefficients with the adoption of all video compression and decompression standards.

In one aspect of the invention, a bidirectional discrete cosine transform (DCT) coefficient scanning apparatus includes: a buffer memory; an address generator which receives a first address signal and generates a second address signal from a look-up table, where the first address may be sequentially incremented and the second address signal depends on a desired scan order for DCT coefficients; and a first selection section which selects as the address signal for the buffer memory either the second address signal or a third address signal which typically depends on a raster scan order. During coding, quantized DCT coefficients from a quantization section are written to locations in the buffer memory identified by the third address signal, and read out to a run-length and level coding section from locations in the buffer memory identified by the second address signal. During decoding, decoded DCT coefficients from a run-length and level decoding section are written to locations in the buffer memory identified by the second address signal, and read out to a dequantization section from locations in the buffer memory identified by the third address signal. A second selection means may be provided to select either quantized data to be written from the quantization section during coding or decoded data from the decoding section during decoding.

In accordance with another aspect of the invention, a bidirectional discrete cosine transform (DCT) coefficient scanning method includes: sequentially incrementing an address signal from a coding/decoding section; and converting the address signal from the coding/decoding section in accordance with a DCT coefficient scan order. The method allows bidirectional scanning. For coding direction, the method includes writing quantized DCT coefficients in a buffer memory in a raster scan order and reading the DCT coefficients out of the buffer memory and into the coding section in the scan order as defined by the converted address signal. For decoding, the method includes writing decoded DCT coefficients from the decoding section into the buffer memory at locations defined by the converted address signal and reading the DCT coefficients out of the buffer memory for inversequantization (or dequantization). The quantization and dequantization sections of a codec can generate address signals identifying sequential addresses or alternatively addresses in any order where the address signals indicate a row and column in a two-dimensional array of DCT coefficients.

BRIEF DESCRIPTION OF THE DRAWINGS

The above object, and other features and advantages of the invention will become more apparent in view of the following detailed description taken in conjunction with the drawings, in which:

FIG. 2 illustrates the zig-zag scan order in an MPEG-2 type DCT coefficient scan;

FIG. 3 illustrates the alternate scan order in an MPEG-2 type DCT coefficient scan; and FIG. 4 illustrates an exemplary look-up table in accordance with the invention.

DETAILED DESCRIPTION OF PREFERRED EMBODIMENT

Figure 1:
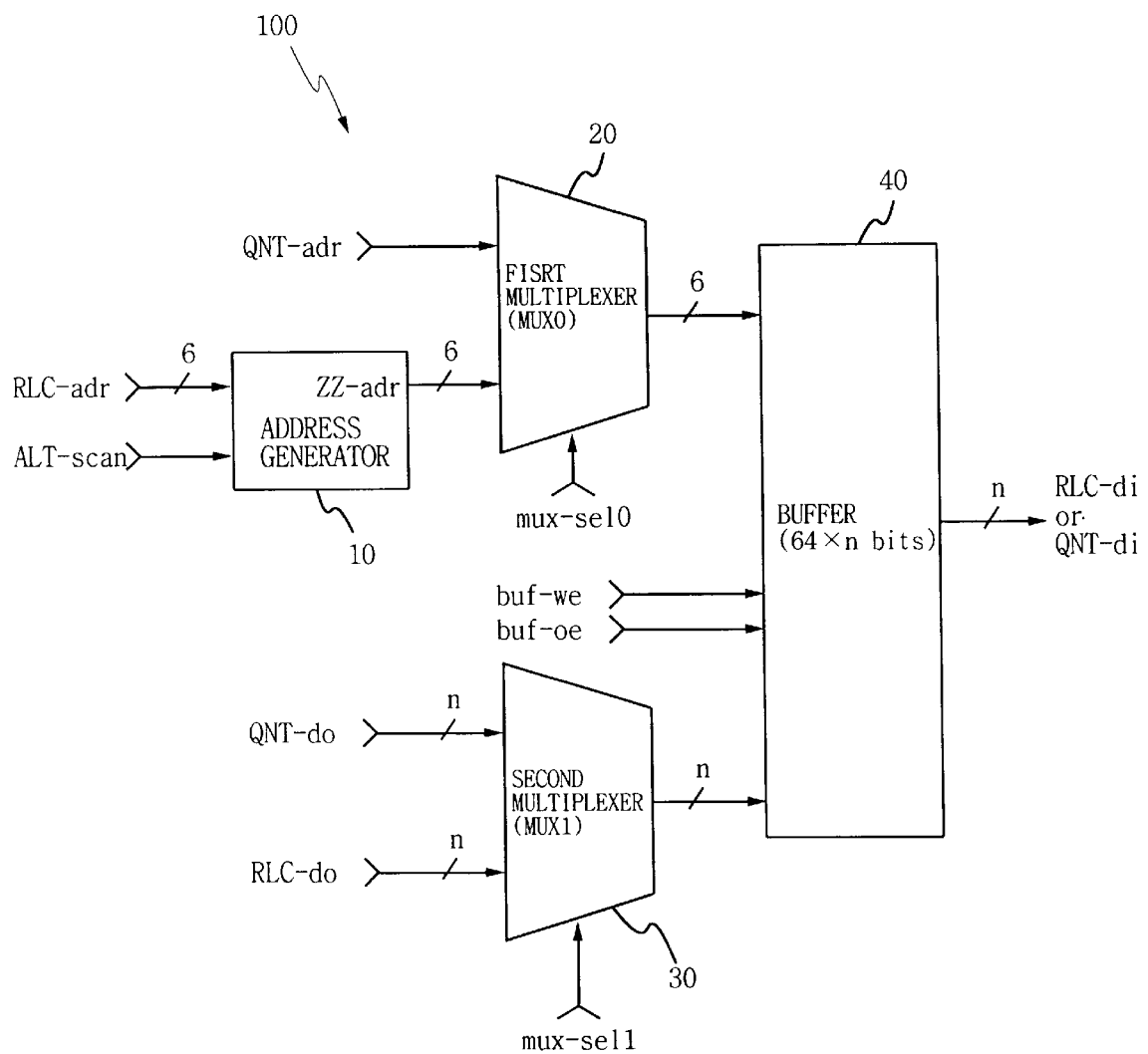
FIG. 1 is a block diagram of the bidirectional DCT coefficient scanning apparatus according to an embodiment of the invention.

FIG. 1 shows a DCT coefficient scanning apparatus 100 for a multi-standard video codec according to an embodiment of the invention. Scanning apparatus 100 includes an address generator 10, first and second selection sections 20 and 30, and a buffer memory 40. Address generator 10 receives a first address signal RLC-adr and generates a second address signal ZZ-adr from address signal RLC-adr and a look-up table that indicates a DCT coefficient scan order. Selection section 20 in response to a first control signal mux-se10 selects either address signal ZZ-adr or a third address signal QNT-adr that depends on an order (typically raster scan order) used when quantizing and dequantizing DCT coefficients. When a read control signal buf-oe is asserted, buffer memory 40 generates a data signal RLC-di or QNT-di representing a DCT coefficient from buffer memory 40 at a location identified by the address signal selected by selection section 20. Selection section 30 in response to a second control signal mux-sell selects either data signal QNT-do representing a quantized DCT coefficient for coding or data signal RLC-do representing a decoded DCT coefficient for dequantization. When a write control signal buf-we is asserted, selection section 30 selects the data signal written to a location in buffer memory 40 indicated by the address signal from selection circuit 20. In a coding mode, data signal QNT-do from a quantization section is selected for writing to a location indicated by address signal QNT-adr, and data signal RLC-di which is input to a coding section is read from an address indicated by address signal ZZ-adr. In a decoding mode, data signal RLC-do from a decoding section is selected for writing to a location indicated by address signal ZZ-adr, and data signal QNT-di which is input to a dequantization section is read from an address indicated by address signal QNT-adr.

Address generator 10 contains one or more look-up tables which are used when generating signal ZZ-adr from address signal RLC-adr. Each look-up table maps a value indicating a position in a sequence in which a DCT coefficient is quantized to a value indicating a position in a sequence in which the DCT coefficient is coded. Since different scan orders are possible for some standards such as MPEG-2, a control signal ALT-scan selects an appropriate look-up table for a particular scan. If scan control signal ALT-scan is in a "0" state, the look-up table provides a conversion corresponding to the zig-zag scan order illustrated in FIG. 2, while if control signal ALT-scan is in a "1" state, the look-up table provides a conversion corresponding to the alternate scan order illustrated in FIG. 3.

FIG. 4 shows exemplary 6-bit values of signal ZZ-adr which address generator 10 generates from a 6-bit address signal RLC-adr and signal ALT-scan. A look-up table which has output signal ZZ-adr associated as shown in FIG. 4 with input signals RLC-adr and ALT-scan may be implemented, for example, using a read only memory (ROM), a random access memory (RAM), a field programmable gate array (FPGA), programmable array logic (PAL), a gate array, or combinational logic having the desired correspondence between input and output signals. Where a memory is used, signals RLC-adr and ALT-scan indicate an address of a storage location containing the corresponding value of signal ZZ-adr. Look-up tables can also be implemented in logic using techniques well known in the art.

In an exemplary embodiment, selection section 20 includes a 6-bit multiplexer which in response to control signal mux-selO, selects either 6-bit scan address signal ZZ-adr from address generator 10 or 6-bit address signal QNT-adr generated in quantization processing. Selection section 30 includes an n-bit multiplexer which in response to control signal mux-sell, selects either n-bit data signal QNT-do generated in quantization processing or n-bit data signal RLC-do generated in RLC processing. Reference numeral n denotes the maximum number of bits used to represent a quantized DCT coefficient as in the compression standards implemented in the video codec. Here, a quantization section or a dequantization section performs quantization or inverse-quantization of a DCT coefficient identified by address signal QNT-adr. Also, a run-length and level coding or decoding section performs coding or decoding in accordance with address signal RLC-adr.

In the exemplary embodiment, buffer memory 40 comprises a (64×n)-bit buffer memory for storing the n-bit DCT coefficients of an 8×8 array of DCT coefficients. Each DCT coefficient in an 8×8 array is stored in buffer memory 40 at a location which correspond to the raster scan order of the DCT coefficients. Reading out the written n-bit data is in accordance with a read control signal buf-oe, to provide data input signal QNT-di for quantization processing or data input signal RLC-di in RLC processing.

The forward and inverse scanning in a multi-standard video codec of an exemplary embodiment of the invention operates as follows. In a coding mode, the quantization section quantizes DCT coefficients of an 8×8 array and transmits the DCT coefficients to scanning apparatus 100 as n-bit data signal QNT-do. The DCT coefficients are typically quantized and transmitted in raster scan order (i.e. the top row of the 8×8 array first then the second, third, fourth, fifth, sixth, seventh, and eighth rows in that order) but alternatively any order can be used. Address signal QNT-adr has a format where the three most significant bits indicate a row of the 8×8 array containing the DCT coefficient represented by signal QNT-do and the three least significant bits indicate the column containing the DCT coefficient represented by data signal QNT-do. For transmission in raster scan order, address signal QNT-adr is sequentially incremented from the 000000b to 111111b. If the DCT coefficients are transmitted in column-by-column order, the three most significant bits of address signal QNT-adr are incremented from 000b to 111b before each time the three least significant bits are incremented. If the DCT coefficients are transferred in another order, address signal QNT-adr must change accordingly. Selection section 20 selects address signal QNT-adr, and selection section 30 selects data signal QNT-do. Write control signal buf-we is asserted to buffer memory 40 so that quantized data signal QNT-do is written in buffer memory 40 at a storage location indicated by address signal QNT-adr. In this fashion, buffer 40 is filled with 64 DCT coefficients corresponding to an 8×8 array.

Thereafter, the RLC section applies address signal RLC-adr to address generator 10. An address represented by signal RLC-adr is sequentially increment for each quantized value read from buffer 40. Address generator 10 converts signal RLC-adr to signal ZZ-adr according to the type of scanning selected by control signal ALT-scan. If control signal ALT-scan is "0", look-up table "(a)" in FIG. 4 which corresponds to the zig-zag scan order of FIG. 2 is selected, while if the signal ALT-scan is "1", look-up table "(b)" in FIG. 4 which corresponds to the alternate scan order of FIG. 3 is selected. Address generator 10 generates address signal ZZ-adr by replacing address signal RLC-adr with the address signal from to the selected look-up table. Selection section 20 selects address signal ZZ-adr to be transmitted to buffer memory 40. Accordingly, when read control signal buf-oe is asserted, the DCT coefficient in buffer memory 40 at a storage location identified by signal ZZ-adr is read out as data signal RLC-di to the coding section. The zig-zag scan order defined by FIG. 2 or FIG. 3 controls the order in which data are read and encoded. Consequently, in the coding mode, data are written in buffer memory 40 in the raster scan order and are read out in a determined scan order, for example, in the zig-zag scan order or the alternate scan order for the run-length and level coding section.

In a decoding mode, the run-length and level decoding section decodes DCT coefficients from an input bit stream and sets data signal RLC-do to indicate a decoded value. An associated value represented by signal RLC-adr increments each time signal RLC-do changes for writing another quantized DCT coefficient in buffer memory 40. The DCT coefficients are decoded in the zig-zag scan order or in the alternate scan order. Address generator 10 converts signal RLC-adr to signal ZZ-adr representing a location for storing the decoded DCT coefficient in buffer memory 40. Alternate scan control signal ALT-scan is set according to the scan order used in run-length and level decoding. Look-up table '(a)' of FIG. 4 corresponds to the zig-zag scan order of FIG. 2 and is selected when the alternate scan control signal ALT-scan is in a "0" state. Look-up table '(b)' of FIG. 4 corresponds to the alternate scan order of FIG. 3 and is selected when the alternate scan control signal ALT-scan is in a "1" state. Address generator 10 generates the second address signal ZZ-adr by replacing an address indicated by signal RLC-adr from the decoding section with an associated address from the selected look-Lp table. Selection section 20 selects and transmits address signal ZZ-adr to buffer memory 40 during the write operation. At the same time, selection section 30 selects and transmits data signal RLC-do to buffer memory 40. When write control signal buf-we is asserted, data signal RLC-do from the decoding section is written in buffer memory 40. Thus, decoded DCT coefficients are written in the scan order of FIG. 2 or FIG. 3 but are stored in locations according to position in a two-dimensional array. Thereafter, to read the decoded DCT coefficients from buffer memory 40, selection section 20 selects address signal QNT-adr when signal buf-oe is asserted. The DCT coefficients stored in buffer memory 40 are read out and applied as data signal QNT-di to the dequantization section in the raster scan order. Consequently, in the decoding mode, the data decoded in the zig-zag scan order or in the alternate scan order are written in the buffer memory 40 and then are read out and inverse-quantized in the raster scan order.

The forward and inverse scanning apparatus 100 provides advantages in that scanning apparatus 100 can adopt all the data compression/decompression standards including but not limited to JPEG, MPEG-1, MPEG-2, H.261, and H.263 since the look-up table in address generator 10 can adapt to appropriate scan orders. Additionally, scanning apparatus 100 permits bidirectional (coding and decoding) scanning using the same address conversion for both coding and decoding.

While the invention has been described and illustrated herein with reference to specific embodiments, various changes in form and details may be made in the embodiments disclosed without departing from the spirit and scope of the invention as defined by the following claims.

What is claimed is:

1. A bidirectional scanning apparatus comprising:
    address generating means for receiving a first address signal and generating a second address signal from a look-up table defining a scan order;
    a first selection means for selecting one of said second address signal and a third address signal in response to a first control signal;
    a second selection means for selecting one of a first data signal and a second data signal in response to a second control signal; and
    buffer memory for storing a data signal selected by said second selection means in a storage location in said buffer memory selected by an address signal selected by said first selection means and for reading out a data signal from a storage location in said buffer memory selected by said address signal selected by said first selection means.

2. The bidirectional scanning apparatus of claim 1, wherein said first address signal and said first data signal are generated by a run-length and level coding/decoding operation.

3. The bidirectional scanning apparatus of claim 2, wherein said third address signal and said second data signal are generated by a quantization/dequantization operation.

4. The bidirectional scanning apparatus of claim 1, wherein said scan order is a selected one of a zig-zag scan order and an alternate scan order for DCT coefficients.

5. The bidirectional scanning apparatus of claim 1, wherein said look-up table comprises a memory, wherein said first address signal is applied to an address for said memory and said second address signal is a data output signal from said memory.

6. The bidirectional scanning apparatus of claim 1, wherein said look-up table comprises one of a gate array, programmable array logic, and a combinational array.

7. The bidirectional scanning apparatus of claim 1, wherein the look-up table is arranged to allow reading or writing in a column-by-column order.

8. A bidirectional scanning method comprising:
    converting a first address signal of a coding/decoding section to a second address signal in accordance with a scan order used by the coding/decoding section;
    writing DCT coefficients to a buffer memory, wherein:
        during coding, DCT coefficients from a quantization section are written into the buffer memory at storage locations identified by a third address signal of the quantization section; and
        during decoding, DCT coefficients from the coding/decoding section are written into the buffer memory at storage locations identified by the second address signal; and
    reading DCT coefficients out of the buffer memory, wherein:
        during coding, the DCT coefficients are read from storage locations identified by the second address signal and are transferred into the coding/decoding section; and
        during decoding, the DCT coefficients are read from storage locations read identified by the third address signal and transferred into the quantization section.

9. The method of claim 8, wherein the first address signal represents a first address which is sequentially incremented, and the second address signal represents a second address which changes according to the scan order.

10. The method of claim 9, wherein the third address signal represents a third address which is sequentially incremented.

11. The method of claim 8, wherein the second address signal is generated from the first address signal using a look-up table.

12. The method of claim 8, wherein during coding, the coding/decoding section performs run-length coding on the DCT coefficients in the order in which the DCT coefficients are read.

13. The method of claim 12, wherein during decoding, the coding/decoding section performs run-length decoding on a bit stream to generate the DCT coefficients written to the buffer memory during decoding.

14. The method of claim 13, wherein the quantization section quantizes the DCT coefficients during coding and dequantizes the DCT coefficients during decoding.

* * * * *